US008073512B2

(12) United States Patent
Chiu

(10) Patent No.: US 8,073,512 B2
(45) Date of Patent: Dec. 6, 2011

(54) MOBILE PHONE

(75) Inventor: Mei-Chun Chiu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 372 days.

(21) Appl. No.: 12/536,324

(22) Filed: Aug. 5, 2009

(65) Prior Publication Data

US 2010/0234065 A1 Sep. 16, 2010

(30) Foreign Application Priority Data

Mar. 13, 2009 (CN) .......................... 2009 1 0300833

(51) Int. Cl.
 *H04M 1/00* (2006.01)
(52) U.S. Cl. .................................... 455/575.4
(58) Field of Classification Search ............... 455/575.4
 See application file for complete search history.

(56) References Cited

U.S. PATENT DOCUMENTS

| 7,542,788 | B2 * | 6/2009 | Lee | ............................. | 455/575.4 |
| 2009/0029748 | A1 * | 1/2009 | Lee | ............................. | 455/575.4 |
| 2009/0029749 | A1 * | 1/2009 | Lee | ............................. | 455/575.4 |

* cited by examiner

*Primary Examiner* — Duc Nguyen
*Assistant Examiner* — Ankur Jain
(74) *Attorney, Agent, or Firm* — Altis Law Group, Inc.

(57) ABSTRACT

A mobile phone includes a main body, a camera, a primary display screen and a secondary display screen. The main body includes a first surface and a second surface opposite to the first surface. The primary display screen is positioned in the first surface. The camera is positioned in the main body. The secondary display screen faces away from the primary display screen, and the secondary display screen is slidable relative to the primary display screen. An image captured by the camera can be seen via the secondary display screen when user self-takes photo.

5 Claims, 4 Drawing Sheets

MOBILE PHONE

BACKGROUND

1. Technical Field

The present disclosure relates to mobile phones and, particularly, to a mobile phone with two display screens.

2. Description of the Related Art

Mobile phones are now equipped with camera for taking photographs. A typical mobile phone includes a main body, a camera and a screen. The main body includes a first surface and a second surface opposite to the first surface. The main body further defines a through hole in the second surface. The screen is positioned on the first surface. The camera is positioned in the main body and receiving light via the through hole, such that an image captured can be seen via the screen. However, when the phone is used to take a self-portrait by aiming the camera to one self, because the display screen is a side of the camera opposite to the camera, it is inconvenient to focus a clear self-portrait.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
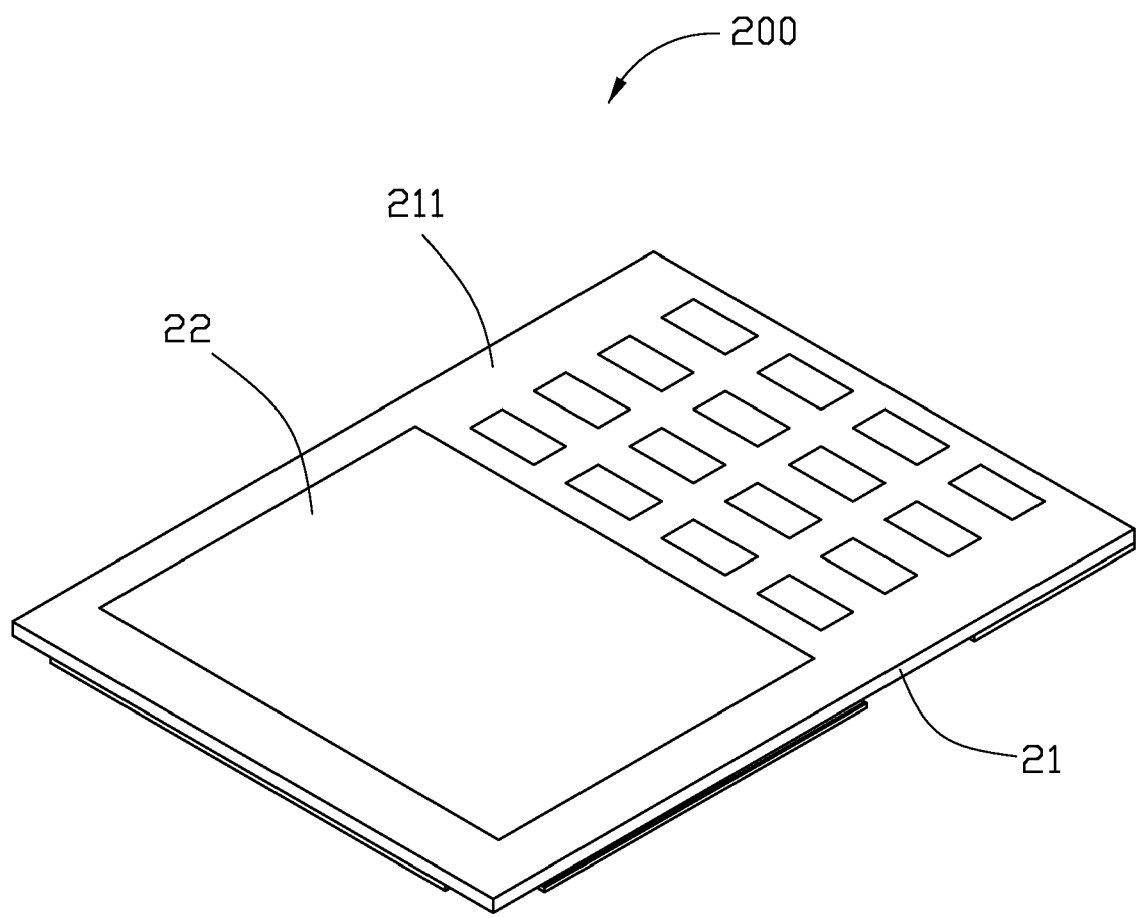
FIG. 1 is an isometric view of an exemplary embodiment of a mobile phone, the mobile phone including a main body and a primary display screen.
Figure 2:
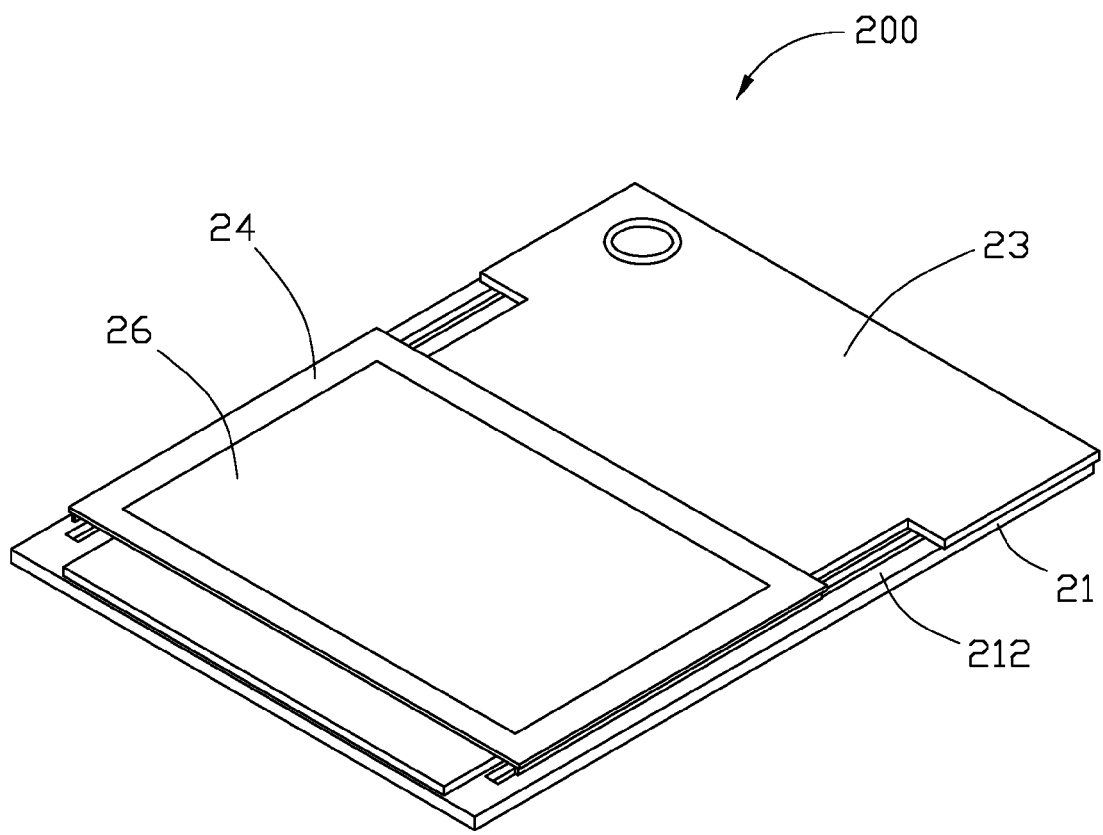
FIG. 2 is similar to FIG. 1, but viewed from another aspect.

Referring to FIGS. 1 and 2, an exemplary embodiment of a mobile phone 200 includes a main body 21, a primary display screen 22, a fixing board 23, a sliding board 24, and a secondary display screen 26. The main body 21 includes a first surface 211 and a second surface 212 opposite to the first surface 211. The primary display screen 22 is positioned on the first surface 211. The fixing board 23 is fixed on the second surface 212. The secondary display screen 26 is fixed on an outer surface of the sliding board 24 and faces away from the primary display screen 22.

Figure 3:
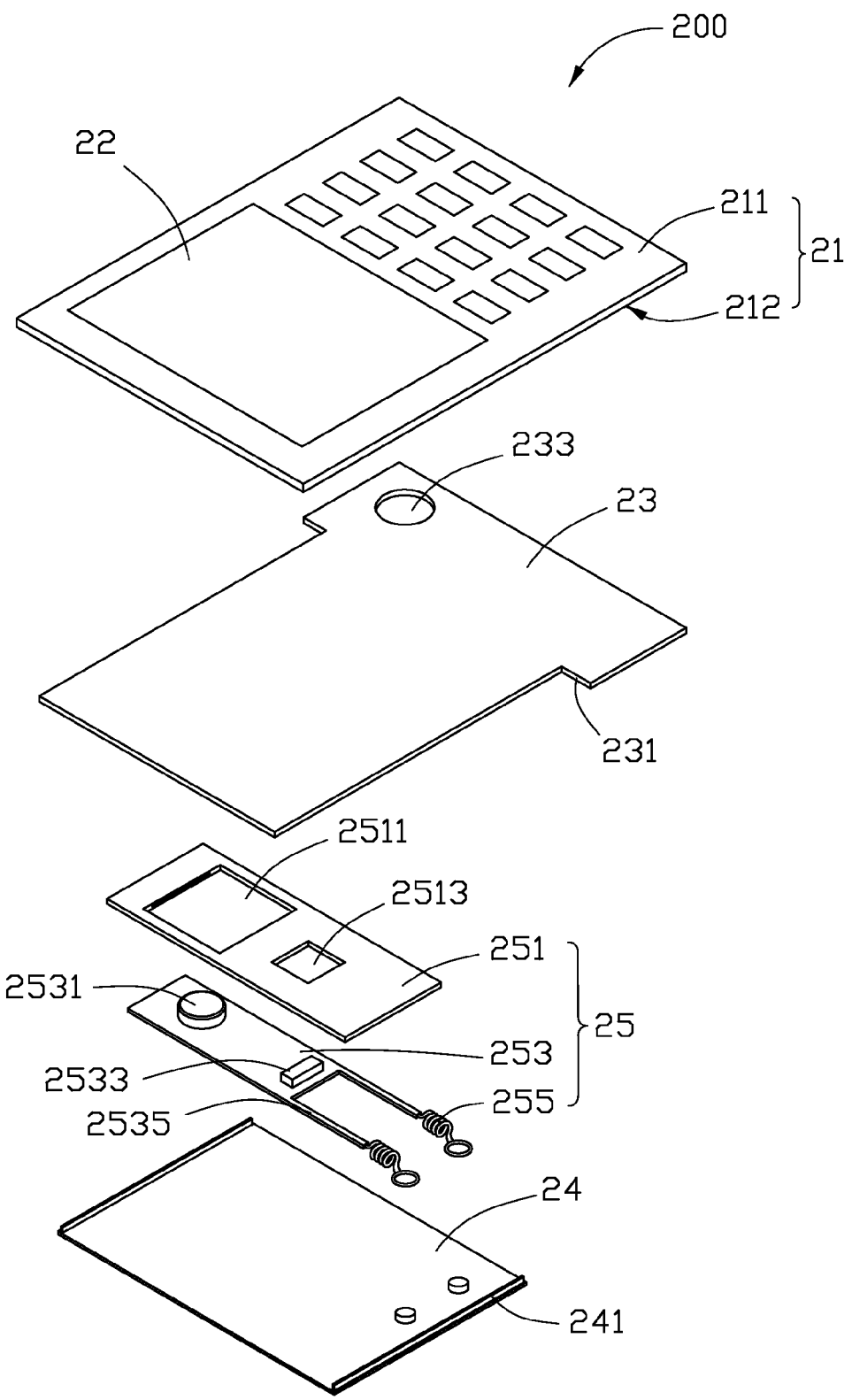
FIG. 3 is an exploded view of the mobile phone shown in FIG. 1.
Figure 4:
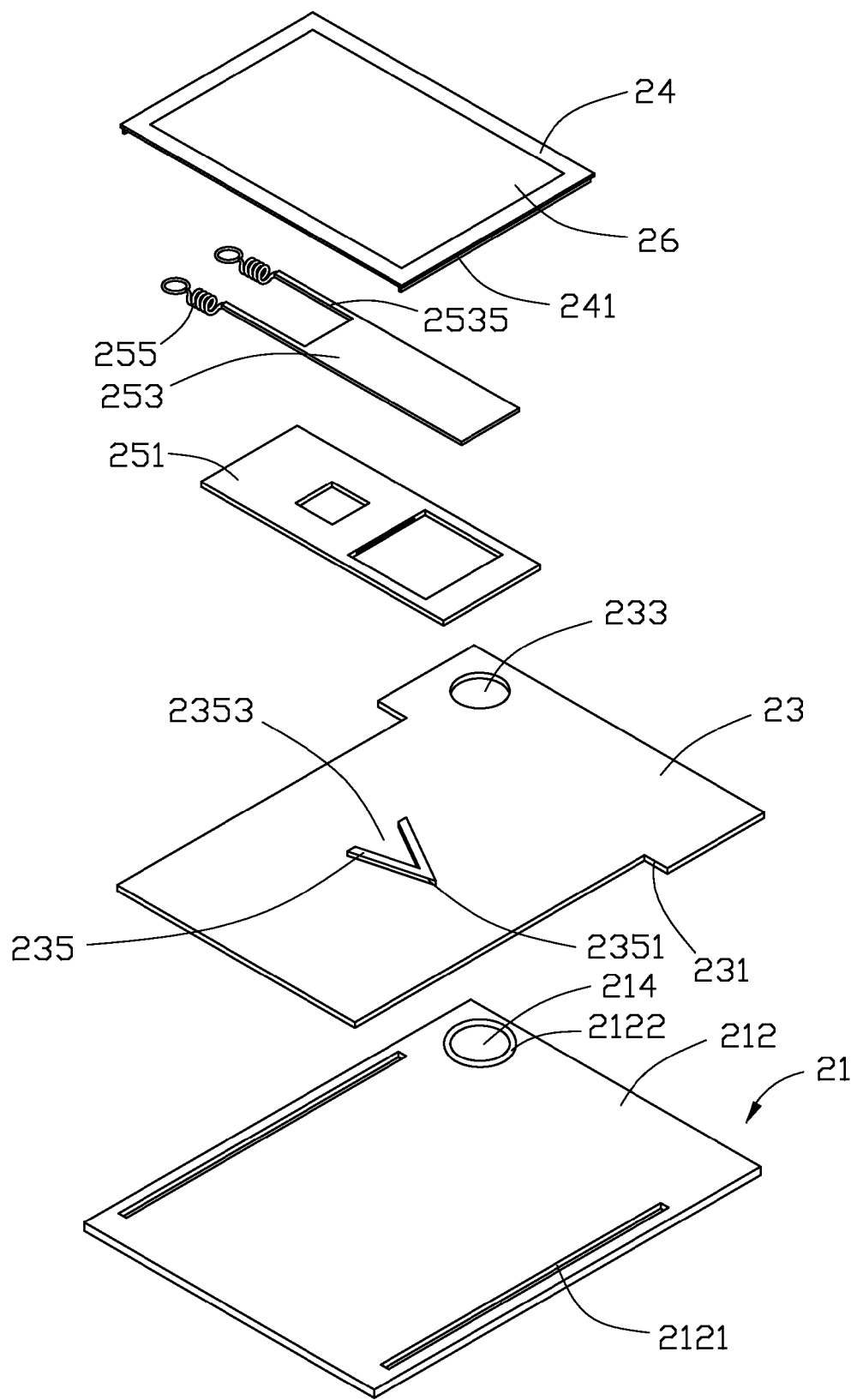
FIG. 4 is similar to FIG. 3, but viewed from another aspect.

Referring FIGS. 3 and 4, the mobile phone 200 further includes a camera 214 and a sliding mechanism 25. The main body 21 defines a pair of sliding slots 2121 and a through hole 2122 in the second surface 212. The camera 214 is positioned in the main body 21 with the camera lens exposing out of the through hole 2122. Both the primary display screen 22 and the secondary display screen 26 are electronically connected to the main body 21 and able to display images captured by the camera 214.

The fixing board 23 is substantially T-shaped. The fixing board 23 forms a pair of limiting portions 231 at each side. The fixing board 23 also forms a sliding rail 235 between the pair of limiting portions. The fixing board 23 defines a guiding hole 233 at a corner of the fixing board 23 adjacent to the limiting portion 231. The sliding rail 235 is substantially V-shaped and protrudes to the side of the fixing board 23. The sliding rail 235 includes a pointed end 2351 and an opening 2353.

The sliding board 24 is substantially rectangular. The sliding board 24 further includes two sliding portions 241 extending out from two edges of the sliding board 24 corresponding to the sliding slots 2121 of the main body 21. The sliding portion 241 engages with the sliding slot 2121, such that the sliding board 24 is slidably fixed to the main body 21.

The fixing mechanism 25 includes a fixing member 251, a sliding member 253 and two springs 255. The sliding member 253 is a plate, and forms a roller 2531 on a surface of the sliding member 253. The sliding member 253 also forms a blocking protrusion 2533 on the surface of the sliding member 253 adjacent to an end of the sliding member 253 and two supporting rods 2535. Each supporting rod 2535 extends out from the end of the sliding member 253 adjacent to the blocking protrusion 2533. The spring 255 interconnects the supporting rod 2535 and the sliding board 24. The fixing member 251 defines a first receiving hole 2511 corresponding to the sliding rail 235 and a second receiving hole 2513 corresponding to the blocking protrusion 2533. The fixing member 251 is securely connected to the sliding board 24. The sliding rail 235 is positioned in the first receiving hole 2511; the blocking protrusion 2533 is positioned in the second receiving hole 2513. The roller 2531 resists an outer edge of the sliding rail 235.

The second receiving hole 2513 is larger than the blocking protrusion 2533. When the sliding board 24 slides along the sliding slot 2121, the roller 2531 slides along the sliding rail 235 to the pointed end 2351, compressing the spring 255 until arriving the pointed end 2351. When the roller 2531 passes over the pointed end 2351, the spring 255 pulls the roller 2531 to slide along the rail way 235 away the pointed end 2351, such that the sliding board can keep moving until the blocking protrusion 2533 resists an side surface of the second receiving hole 2513.

When the mobile phone 200 is used for self-portrait, the camera 214 faces the user, and an image captured can be seen via the secondary display screen 26, such that the user can adjust a position of the mobile phone 200 to capture a clear image.

The mobile phone 200 may be a slide-type phone, the main body 21 is a slide cover of the slide-type phone. The secondary display screen 26 is hidden behind the main body 21 when the mobile phone is folded to protect the secondary display screen 26 from dust and stains. When the mobile phone 200 is unfolded, the secondary display screen 24 can be moved out for use. The mobile phone 200 may further include a switch to turn off the secondary display screen 26 when not used.

Finally, while the exemplary embodiments have been described and illustrated, the disclosure is not to be construed as being limited thereto. Various modifications can be made to the exemplary embodiments by those of ordinary skilled in the art without departing from the true spirit and scope of the disclosure as defined by the appended claims.

What is claimed is:

1. A mobile phone comprising:
   a main body comprising a first surface and a second surface opposite to the first surface;
   a camera positioned in the main body;
   a primary display screen positioned in the first surface;
   a secondary display screen facing away from the primary display screen, wherein the second screen is slidable relative to the primary display screen;

wherein the mobile phone further comprises a sliding board slidably fixed on the second surface, the secondary display screen is fixed to the sliding board;

a fixing board positioned on the second surface of the main body and a sliding mechanism positioned between the sliding board and the fixing board;

wherein the sliding mechanism comprises a sliding member and two springs, one end of each spring fixed to the sliding member, the other end of each spring connecting with the sliding board, the fixing board further comprises a V-shaped sliding rail formed on a surface of the fixing board, the sliding member further comprises a roller resisting an outer edge of the V-shaped sliding rail, such that the roller is able to tension the springs and slide along the V-shaped sliding rail.

2. The mobile phone of claim 1, wherein both the primary display screen and the secondary display screen are able to display images captured by the camera.

3. The mobile phone of claim 2, wherein the main body defines a through hole, the camera receiving light via the through hole to capture images.

4. The mobile phone of claim 3, wherein the fixing board defines a guiding hole connecting to the through hole of the main body.

5. The mobile phone of claim 1, wherein the sliding board comprises two sliding portions formed at each side, the main body comprises two sliding slots defined on the main body, the sliding portions engages with the sliding slots, such that the sliding board is slidably fixed to the main body.

* * * * *